United States Patent
Roffe et al.

(10) Patent No.: US 6,411,954 B1
(45) Date of Patent: Jun. 25, 2002

(54) METHOD AND APPARATUS FOR PERSISTING OBJECT ORIENTED DATA

(75) Inventors: James Roffe, Blaine; Edward Stafford, North Oaks, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/444,484

(22) Filed: Nov. 19, 1999

(51) Int. Cl.[7] .......................... G06F 17/30; G06F 7/00
(52) U.S. Cl. ............................................ 707/8
(58) Field of Search ................. 707/1–10, 100–104.1, 707/200–204, 500–512; 709/310–332

(56) References Cited

U.S. PATENT DOCUMENTS

| | | | | |
|---|---|---|---|---|
| 5,377,350 A | * | 12/1994 | Skinner | 709/201 |
| 5,751,958 A | * | 5/1998 | Zweben et al. | 707/8 |
| 5,884,327 A | * | 3/1999 | Cotner et al. | 707/201 |
| 6,192,408 B1 | * | 2/2001 | Vahalia et al. | 709/217 |
| 6,275,953 B1 | * | 8/2001 | Vahalia et al. | 714/11 |

* cited by examiner

Primary Examiner—John Breene
Assistant Examiner—Linh Pham
(74) Attorney, Agent, or Firm—Charles A. Johnson; Mark T. Starr; Crawford, PLLC

(57) ABSTRACT

A method and apparatus for persisting object oriented data are provided in various embodiments. Persistent storage is established for a working data set and a committed data set. The areas for the working and committed data sets are used for storage of the persistent data objects. After a persistent data object is updated in computer memory, the updated version is written to the working data set. Then, references to the working data set and the committed data set are switched, whereby the working data set becomes the committed data set and the committed data set becomes the working data set.

20 Claims, 7 Drawing Sheets

METHOD AND APPARATUS FOR PERSISTING OBJECT ORIENTED DATA

FIELD OF THE INVENTION

The present invention generally relates to operational maintenance of data processing systems, and more particularly to saving and restoring state information.

BACKGROUND

There are numerous software applications in which data integrity is critical. The applications range from airlines reservations systems to systems for controlling and operating large scale data processing systems. The need for data integrity is largely equal in all cases. However, the quantity of data and the frequency of updates to the data may vary greatly from application to application.

There is a present trend toward implementing new and improved software applications using object oriented programming (OOP) languages. OOP languages provide a convenient means for implementing graphical user interfaces and also enhance extensibility of the software.

Object oriented database management systems are well-suited for integration with object oriented applications and provide the necessary functionality for backing-up and recovering transaction oriented data. However, the backup and recovery process can be cumbersome in certain applications where the end-user neither needs nor requires the capabilities of a robust database management system. In addition, a fully capable database management system may be costly and require significant computing resources. Object oriented database management systems are less than optimal for use with applications requiring data integrity but having low transaction rates.

A system and method that addresses the aforementioned problems, as well as other related problems, are therefore desirable.

SUMMARY

A method and apparatus are provided in various embodiments for persisting object oriented data with reduced overhead. Persistent storage is established for a working data set and a committed data set. The areas for the working and committed data sets are used for storage of the persistent data objects. After a persistent data object is updated in computer memory, the updated version is written to the working data set. Then, references to the working data set and the committed data set are switched, whereby the working data set becomes the committed data set and the committed data set becomes the working data set.

In accordance with another embodiment of the invention, there is provided a computer program product that is configured to be operable to persist object oriented data objects.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
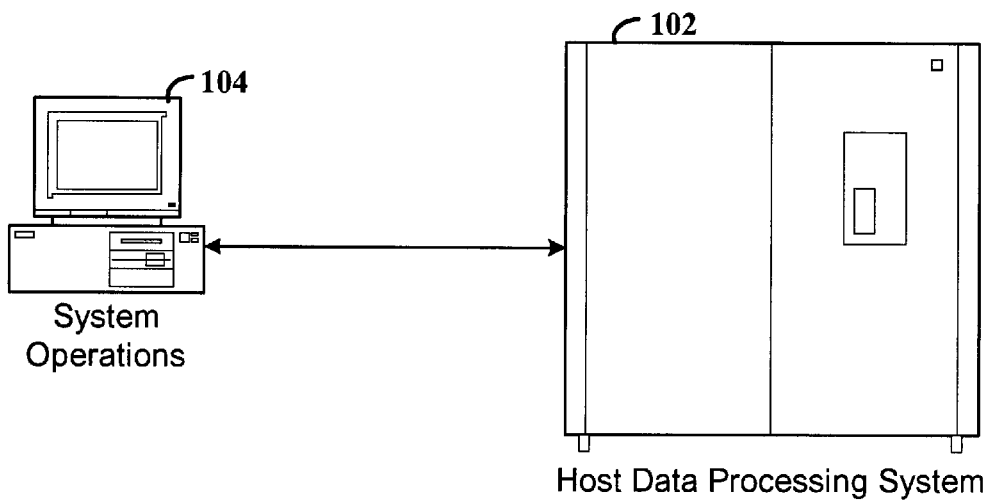
FIG. 1 illustrates a systems operations console coupled to a host data processing system.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of object oriented applications. The invention has been found to be particularly applicable and beneficial for persisting data objects related to operations and configuration information of a large scale data processing system. While the present invention is not so limited, an appreciation of the present invention is presented by way of an embodiment including a systems operations console and a host data processing system.

FIG. 1 illustrates a systems operations console coupled to a host data processing system. Host system 102 is a 2200 Series data processing system, for example, and includes configurable computing resources such as memory subsystems, mass storage subsystems, communication channels, and multiple instruction processors. The computing resources are typically managed by the host operating system (not shown) and configured for availability by a system operator via operations console 104. It will be appreciated that the platform on which the operations console is implemented can be built within the cabinet of host 102 or implemented in a separate cabinet as shown.

Through operations console 104, an operator can partition host 102 into multiple data processing systems, enable or disable access to storage systems, and activate or deactivate instruction processors, for example. Since operations console 104 oversees the various partitions and configuration information of host 102 and is implemented on a separate computing platform, the operations console must ensure that the configuration information will persist between an unexpected shutdown of the console and restarting the console.

One solution to making the configuration information persistent between console shutdown and restart is with an object oriented database with transaction commit capabilities. This approach, however, introduces additional operations complexity to the operator and also requires substantial computing resources from operations console 104. Thus, it would be desirable for operations console 104 to make the state information persistent without requiring additional maintenance activities from the operator and without significantly increasing the computing requirements of operations console 104.

Figure 2:
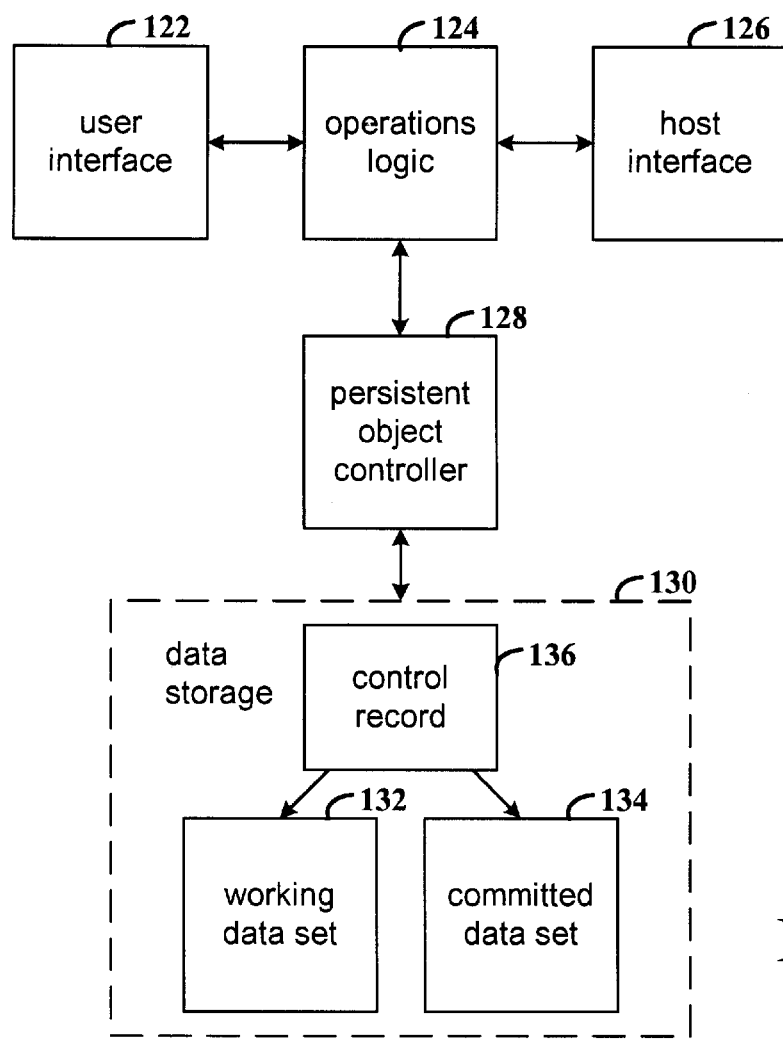
FIG. 2 is a functional block diagram illustrating software components used to interface, operate, and manage host 102, in accordance with one embodiment of the invention.

FIG. 2 is a functional block diagram illustrating software components used to interface, operate, and manage host 102, in accordance with one embodiment of the invention. The software components include user interface 122, operations logic 124, host interface 126, and persistent object controller 128. Various software technologies can be used to implement the different components. For example, an object-oriented language may be suitable for user interface 122, operations logic 124, and persistent object controller 128, while a third generation language, such as C, may be suitable for host interface 126.

User interface 122 and operations logic 124 provide the functionality that enables the operator to manage the operations of host 102. User interface 122 may be implemented as a graphical user interface, for example, and operations logic 124 includes the rules that govern operation of system 102. For example, operations logic 124 restricts the operator to configuring valid hardware combinations. Host interface 126 is conventional software that provides communication between operations logic 124 and the operating system of host 102.

In one embodiment, persistent object controller 128 is implemented in C++ and manages information that must persist relative to the configuration of host 102. For example, the persistent configuration information may include which processors, communications channels, mass storage devices, and input/output channels are associated with which partition. Class definitions support extensibility of the configuration data to persist, and persistent object controller controls and tracks which data is persistent, along with committing data to persistent storage and recovering persistent data when necessary.

Updates to persistent data as stored in computer memory of console 104 is performed by the software component responsible for the data, for example, operations logic 124. Persistent object controller 128 handles committing the updates to data storage element 130.

In one embodiment, storage element 130 is a conventional magnetic disk of the type generally used with microcomputers. Those skilled in the art will recognize other suitable media. The reliability of storage element 130 is commensurate with the nature of the persistent data. For example in a systems operations environment, the storage element should be very reliable since a failure could have a far-reaching impact on applications hosted by system 102.

Persistent object controller 128 uses commit and recover procedures, as initiated by operations logic 124, for example, to store and recover persistent data to and from storage element 130. All persistent data objects are registered with persistent object controller 128 and defined to be part of a persistent data set. After an application such as operations logic 124 has updated the persistent data set and determined that the data can be committed, a call is made to a commit method that is implemented in persistent object controller 128. The commit method writes the persistent data set to working data set 132, and then switches working data set 132 and committed data set 134. In other words, at commit time the working data set becomes the committed data set and the committed data set becomes the working data set. The switch is accomplished in one embodiment by updating control record 136 with new references to the working and committed data sets.

Figure 3:
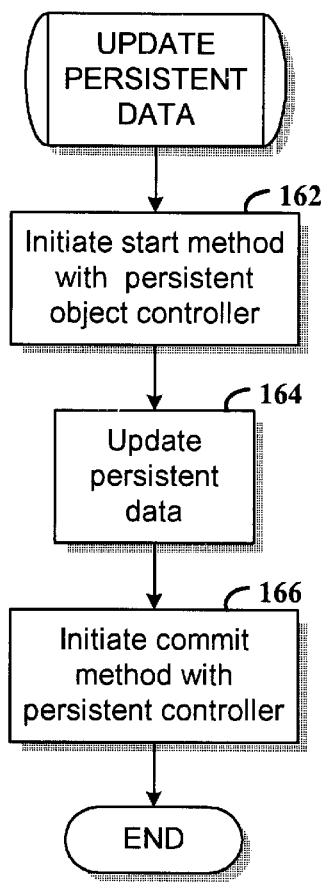
FIG. 3 is a flowchart of a process for updating persistent data in accordance with one embodiment of the invention.

FIG. 3 is a flowchart of a process for updating persistent data in accordance with one embodiment of the invention. The process is performed by software, for example, operations logic 124 having persistent data registered with persistent object controller 128. The process generally follows a transaction-oriented procedure for committing data at the appropriate time.

At step 162, a start method as provided by persistent object controller 128 is initiated by the calling software. The start method generally associates a transaction object with the thread of the calling software. The transaction object is used to track the persistent data objects locked by the transaction.

At step 164, the persistent data is updated in computer memory, and the commit procedure of the persistent object controller is initiated at step 166. The commit procedure generally entails writing the updated persistent data from memory to mass storage, and maintaining working and committed versions of the persistent data.

Figure 4:
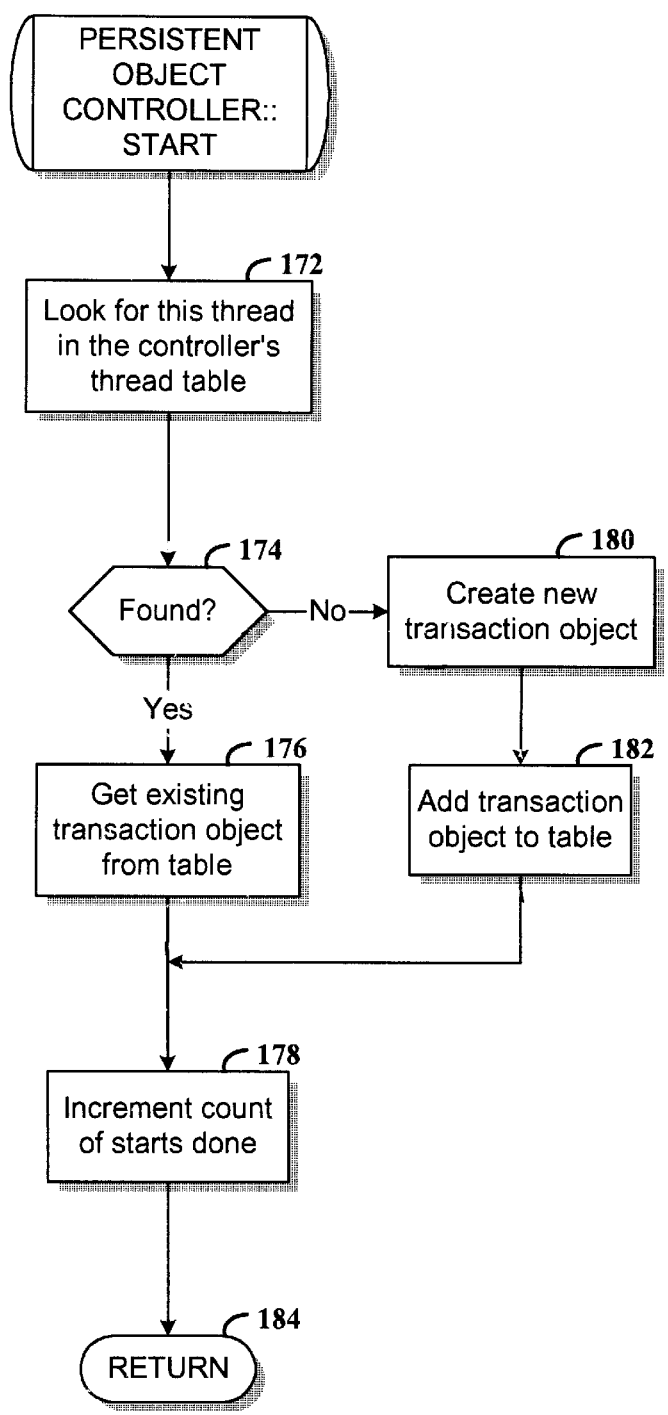
FIG. 4 is a flowchart of a process that implements a start method in a persistent object controller.

FIG. 4 is a flowchart of a process that implements a start method in persistent object controller 128 in accordance with one embodiment of the invention. The start method coordinates the association of transaction objects with threads that are updating persistent data. Each thread that initiates the start method has associated therewith a transaction object.

At step 172, the start method of the persistent object controller searches for the thread of the calling application in a thread table (not shown). The thread table indicates which threads presently have transaction objects associated therewith. If the thread is found, decision step 174 directs control to step 176 to obtain the associated transaction object. At step 178, the start-count that is associated with the thread is incremented. The start-count is used to track by thread the number of transactions involving persistent data that are in process and incomplete. When a thread initiates committing persistent data, the persistent data is written to persistent storage only when there are no transactions currently in process by the thread.

If the thread of the calling application does not yet have an associated transaction object, control is directed to step 180 where a new transaction object is instantiated. At step 182, a new entry is added to the transaction map (not shown).

Figure 7:
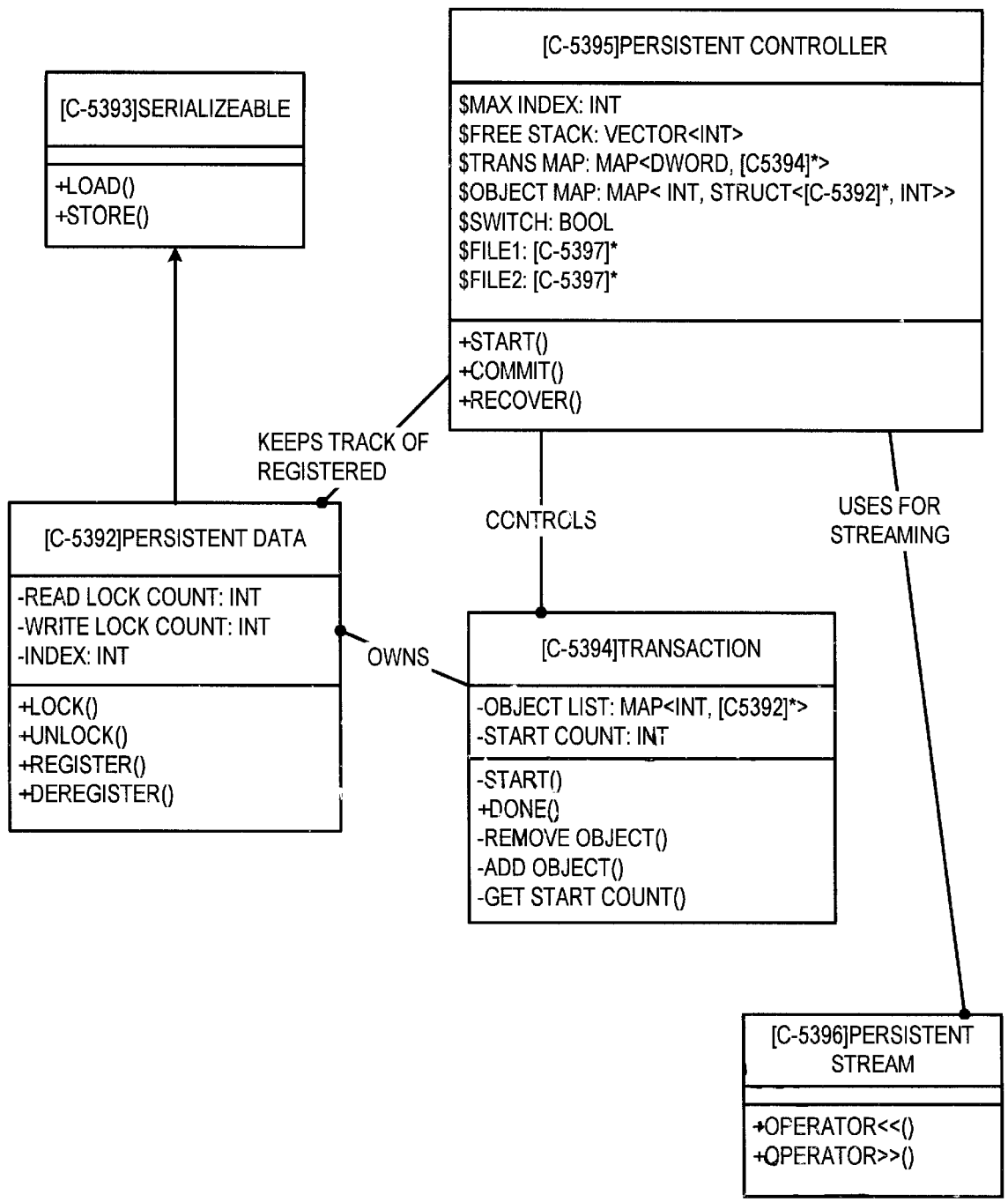
FIG. 7 is an object model diagram that illustrates class relationships for managing persistent data.

The transaction map (as embodied in the Trans Map attribute of the Persistent Controller object of FIG. 7) is a table having the thread identifier as the key and the transaction object pointer as the value. The transaction map is used to find a thread's transaction object on a lock/unlock call without having to pass the transaction object in the call. The thread identifier is obtained from the operating system and is used as the key into the transaction map to obtain the pointer to the transaction object. Control is returned to the calling application at step 184.

Figure 5A:
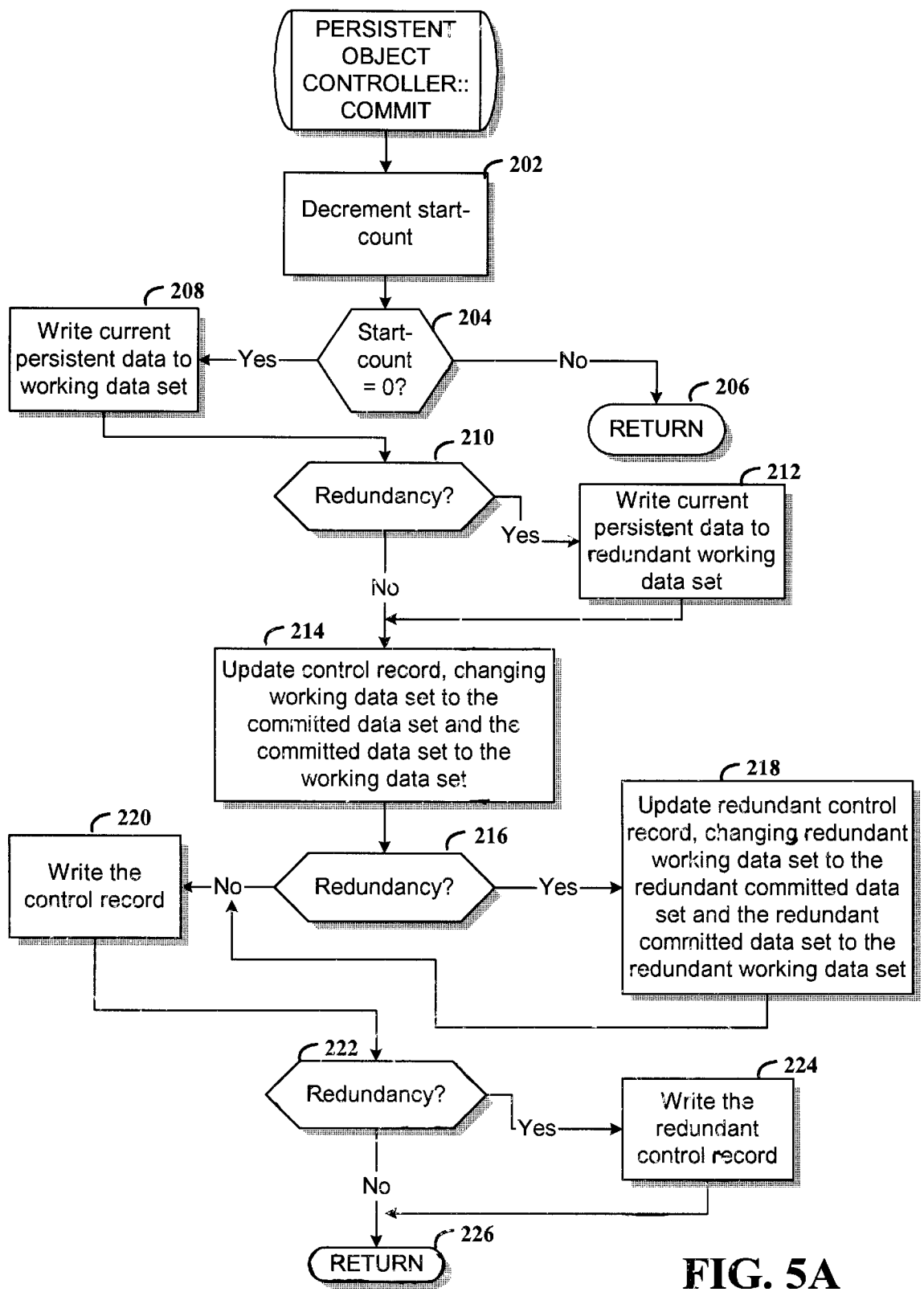
FIG. 5A is a flowchart of a process for committing persistent data objects.

FIG. 5A is a flowchart of a process for committing persistent data objects in accordance with one embodiment of the invention. The commit process generally writes the updated persistent data to working data set 132 and updates control record 136 to switch references between working data set 132 and committed data set 134.

At step 202, the start-count is decremented for the application thread initiating the commit. If the start count is not 0, decision step 204 directs control to step 206 to return control to the calling application. If the thread has in process multiple transactions involving persistent data, the persistent data will be written to mass storage only after all the transactions are complete (start-count=0). At step 208, the persistent data is written to the working data set in mass storage.

As an added data integrity measure, the persistent data objects may optionally be stored redundantly. That is, duplicate versions of working data set 132 and committed data set 134 are maintained if a "redundancy" parameter is associated with the persistent data objects. Thus, if redundancy is specified, decision step 210 directs control to step 212 where the current persistent data is written to a redundant working data set. It will be appreciated that the data storage element on which the redundant data is stored may be the same as or separate from data storage element 130, depending up on the level of data protection desired.

At step 214, the control record is updated. The control record includes references to working data set 132 and committed data set 134, which are switched after working data set 132 has been written. After step 214, the former working data set is the present committed data set, and the former committed data set is the current working data set. The working and committed data sets are maintained to preserve data integrity in the event console 104 fails while writing to working data set 132.

If redundancy is specified, decision step 216 directs control to step 218 where the redundant control record is updated. The references to the redundant working data set and redundant committed data set are switched, whereby the former redundant working data set becomes the current redundant committed data set and the former redundant committed data set becomes the current redundant working data set.

At step 220, the control record from console 104 is written to control record 136 of storage element 130. If redundancy is specified (decision step 222), the redundant control record is also written to a storage element (step 224). Control is returned to the calling application at step 226.

The method for committing and restoring persistent data is handled by persistent object controller 128 such that pointers between objects can be recreated when a recovery is done from storage element 130. As objects are registered for persistence they are assigned an index. When a pointer to an object is to be saved the index is saved instead. When it is necessary to recreate the objects from persistent storage empty versions of all objects are created. These objects are then populated. As pointers are restored the index is used to create a pointer to the correct object.

Figure 5B:
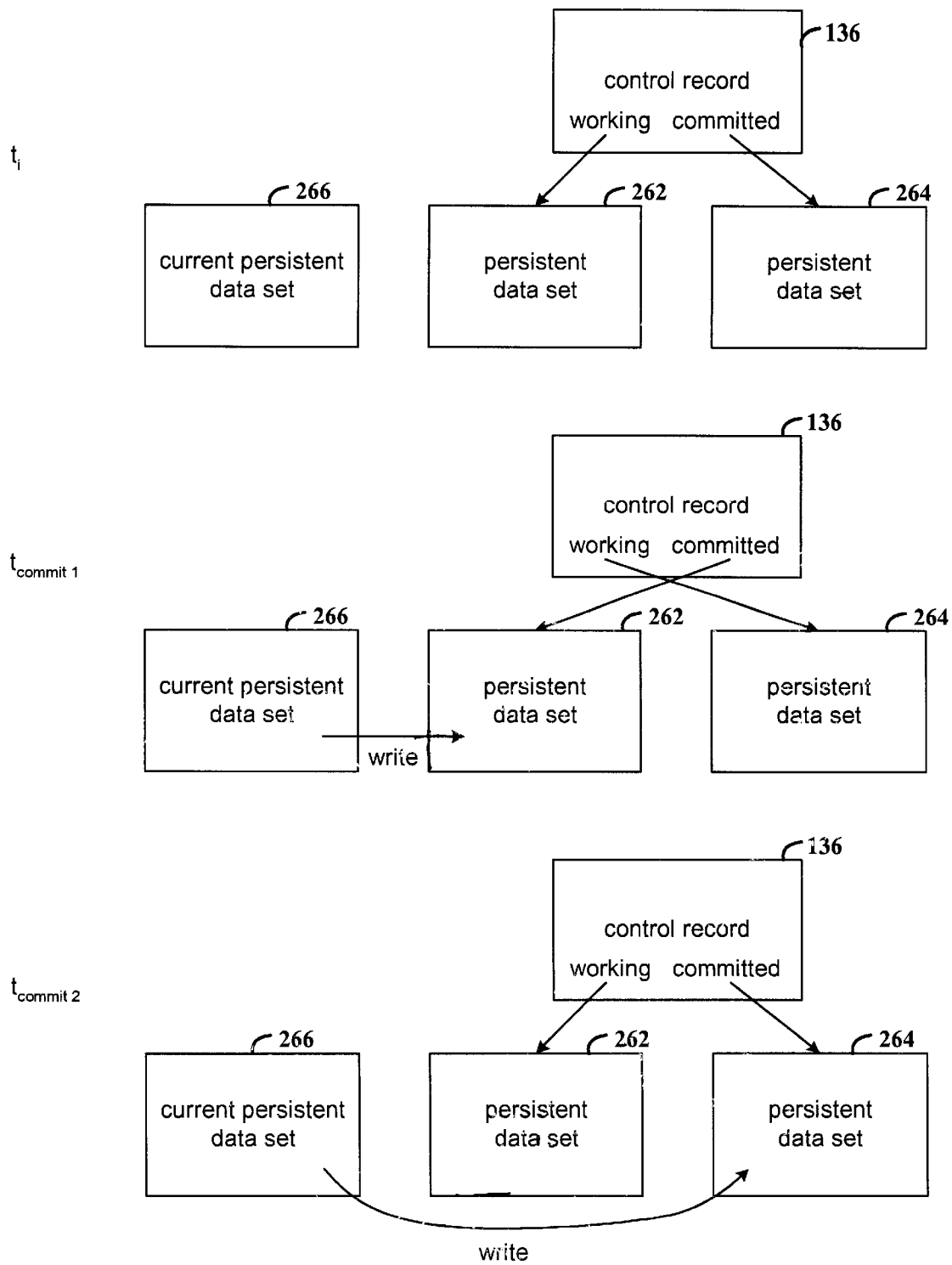
FIG. 5B illustrates a current persistent data set, a control record, and working and committed data sets as related initially at time $t_i$, after a first commit at time $t_{commit1}$, and after a second commit at time $t_{commit2}$.

FIG. 5B illustrates a current persistent data set, a control record, and working and committed data sets as related initially at time $t_i$, after a first commit at time $t_{commit1}$ and after a second commit at time $t_{commit2}$. At time $t_i$, control record 136 references data set 262 as the working data set and data set 264 as the committed data set. Current data set 266 represents the persistent data as present in the memory of console 104.

At time $t_{commit1}$, the current persistent data set 266 is written to data set 262, which then becomes the committed data set, and data set 264 becomes the working data set. At time $t_{commit2}$, current persistent data set 266 is written to data set 264, which becomes the committed data set, and data set 262 becomes the working data set.

Figure 6:
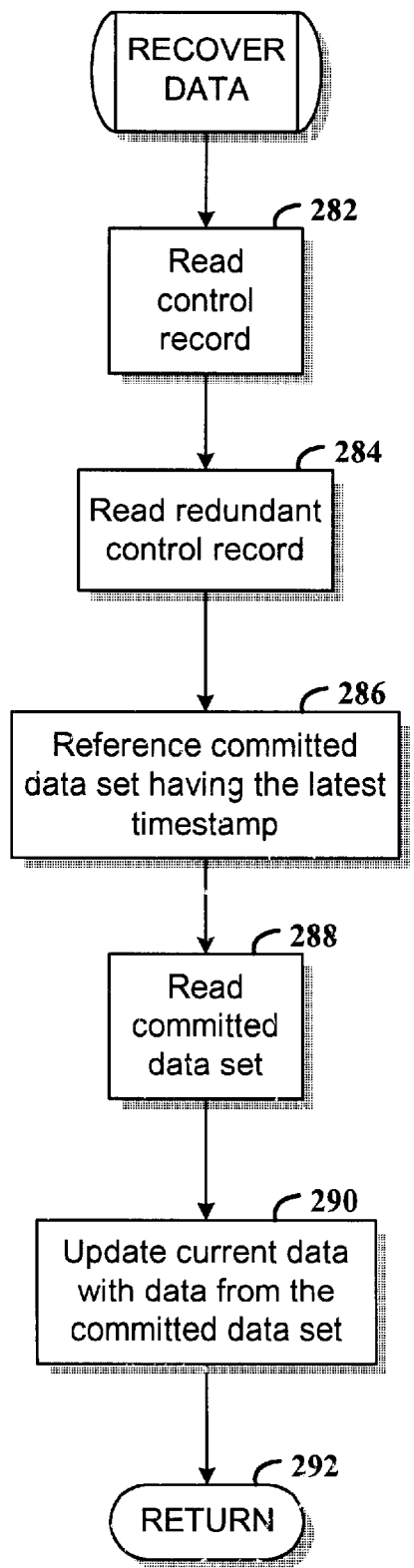
FIG. 6 is a flowchart of an example process for recovering persistent data.

FIG. 6 is a flowchart of an example process for recovering persistent data in accordance with one embodiment of the invention. At step 282, control record 136 is read from storage element 130, and at step 284, the redundant control is read if redundancy is specified.

The timestamps present in control record 136 and in the redundant control record are compared at step 186, and the committed data set that is referenced by the control record having the later timestamp is selected for restoration.

At step 288, the committed data set selected at step 286 is read from storage element 130, and at step 290, the current data set is updated using data from the selected committed data set. Control is returned the calling application at step 292.

FIG. 7 is an object model diagram that illustrates class relationships for managing persistent data in accordance with one embodiment of the invention. Objects of the Persistent Data class inherit from the Serializable class. Persistent objects inherit from an object that allows the capability of persistence. It is, therefore possible to create different instances of a particular object some of which are persistent and some of which are not. The act of registering an object makes it persistent when the transaction completes.

Objects for which persistence is desired are allowed to contain both persistent and non-persistent data. The Load and Store methods of the Serializable class provide the means to make this selection. These methods provide the selection of data and its transition to or from a serial stream. The Persistent Data class from which all persistent objects inherit declares, as pure virtual, the load and store methods (for saving and restoring data). As shown in the object model diagram, it is the Serializable class that declares, as pure virtual, the load and store methods. All persistent objects are forced to implement these methods because they indirectly inherit from the Serializable class. Persistent objects inherit from the Persistent Data class which inherits from the Serializable class. Since the Persistent Data class does not implement load and store, all persistent objects are required to do so. This forces all persistent objects to implement these methods. The persistent controller will call load and store on the objects of the Persistent Data class, but the actual implementation of these methods is in the objects that inherit from the Persistent Data class.

When persistent data is recovered, a default constructor (no data supplied) is used to create each object in the file and then call the load method on each object so that the object can load its data. For committing persistent data, each object that has been modified during the transaction (identified using the list in the transaction object) is called to commit its data to the persistent stream (buffer that is written to the persistent file). The method called is the store method.

The attributes and method of the objects of FIG. 7 are described in the paragraphs that follow.

Serializeable Object:
Load—pure virtual method (implemented in derived class)
Store—pure virtual method (implemented in derived class)

Persistent Data Object:
Read Lock Count—count of read locks outstanding. Read Lock Count allows for nested locking (e.g. lock, lock, unlock, unlock). A count >0 locks object from being used by another thread (transaction).
Write Lock Count—count of write locks outstanding. Count allows for nested locking (e.g. lock, lock, unlock, unlock). A count >0 locks object from being used by another thread (transaction). When this count is >0 we will write this object (call the store method) during commit.

Index—index value assigned to this object instance.

Lock—sets (increments) lock count. Parameter indicates read or write. If another thread has the object locked, then this causes a wait.

Unlock—decrements lock count.

Register—register this object instance with the persistent subsystem. This method gets the index value for the object and locks the object for write.

Deregister—calls the persistent subsystem to mark the object as being deregistered and locks the object for write. The object will be removed from persistence on the next commit.

It will be appreciated that the application data desired to be persistent are implemented as objects that inherit from the Persistent Data class.

Persistent Controller Object:

Max index—highest index value used so far.

Free stack—vector of freed index values.

Trans map—map construct with key=thread ID from the operating system and value=a pointer to the transaction object that corresponds to that thread Object map—map construct with key=object index and value=a structure which contains a pointer to the Persistent Data object for the index and the file address (offset into the file) where that object is saved Switch—Boolean to indicate which buffer is the current one (two memory buffers used—working and committed)

File1 and file2—file handles for the two persistent files (local and redundant)

Start—starts a transaction. If the thread already has a transaction, this increments the start count on the transaction. If not, then a new transaction object is allocated with a count of 1.

Commit—If the start count in the thread's transaction is 1 on entry, all objects updated by the transaction (those with write locks) are written to the persistent store and all locks are released. Decrements the start count on the transaction for the thread.

Recover—recovers persistent objects from the persistent file. This is used at system startup/initialization to re-create persistent objects.

Transaction Object:

Object list—map construct with key=object index and value=pointer to the Persistent Data object for that index. This is a list of the objects locked by the transaction.

Start count—count of the starts done (see Persistent Controller above).

Start—increments start count.

Done—decrements start count. When count goes to zero, the object list is cleared.

Remove object—removes an object from the transaction's object list. Called because an unlock has been done which resulted in 0 locks left up.

Add object—adds an object to the transaction's object list.

Get start count—returns the start count.

Persistent Streams Object:

Operator <<—streams a data value to the persistent stream (writes a value to the persistent buffer)

Operator >>—streams a data value from the persistent stream (reads a value from the persistent buffer)

Figure 8A:
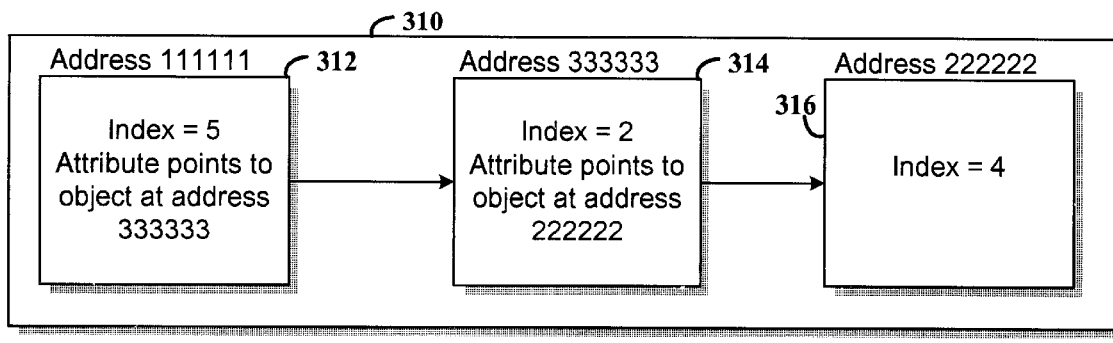
FIGS. 8A, 8B, and 8C illustrate the interrelationships between persistent data objects, indices, saved indices, and saved data of persistent data objects.
Figure 8B:
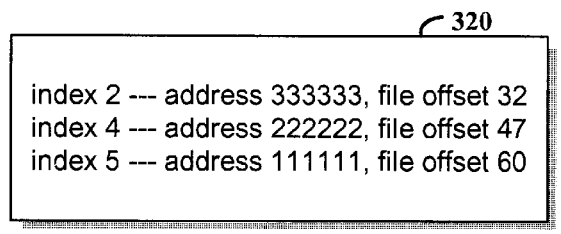
Figure 8C:
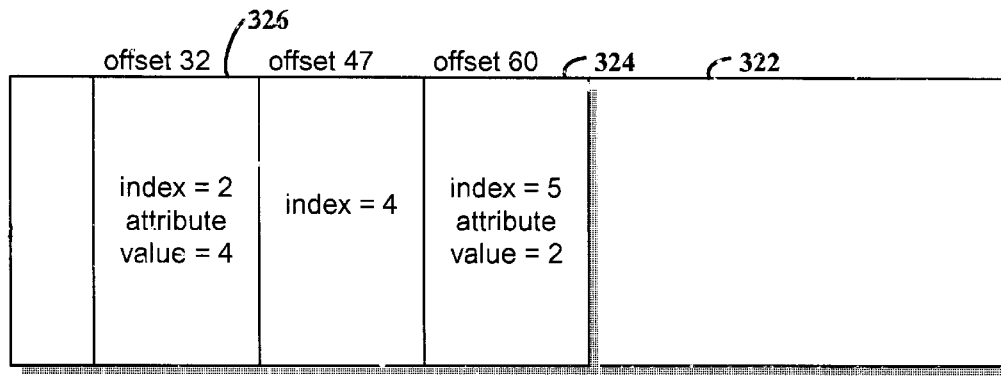

FIGS. 8A, 8B, and 8C illustrate the interrelationships between persistent data objects, indices, saved indices, and saved data of persistent data objects. FIG. 8A shows a memory 310 having example persistent data objects 312, 314, and 316. While not shown, it will be appreciated that each of persistent data objects 312, 314, and 316 may include additional attributes that reference the data for which persistence is desired.

Object 312 is stored at memory address 111111, object 314 is stored at memory address 333333, and object 316 is stored at memory address 222222, for example. Each persistent data object includes an attribute that references one or more related persistent data objects. For example, object 312 has an attribute, the memory address 333333, for referencing the related data object 314, and object 314 references the data object at address 222222. These memory references indicate class relationships between the persistent data objects.

Each of persistent data objects 312, 314, and 316 also includes an index value for referencing an entry in persistent controller object map 320 of FIG. 8B. Each entry in map 320 is associated with a persistent data object and includes the memory address of the persistent data object and the persistent storage address at which the persistent data object is stored. The persistent storage address is, for example, a file relative offset into persistent data file 322 of FIG. 8C. The persistent data object of at memory address 333333 is stored in file 322 at offset 32, the persistent data object of at memory address 222222 is stored in file 322 at offset 47, and the persistent data object of at memory address 111111 is stored in file 322 at offset 60.

Each of the persistent data objects stored in file 322 includes its associated index, along with attribute values that reference related persistent data objects (if there are related objects). For example, the persistent data object from memory address 111111 has the index value 5 and is stored at offset 60. Persistent data object 324 at offset 60 includes two attributes. The first attribute is the index value 5 that is associated with the persistent data object, and the second attribute references the index of a related persistent data object. For example, the attribute value 2 is the index attribute of persistent data object 314 which is pointed to by data object 314. Similarly, data object 326 stored at file offset 32 and having index value 2, is associated with persistent data object 314 and has an attribute value 4 which references the index of persistent data object 316. Since object 316 has no related objects, there is attribute value. Storing the indices of the related persistent data objects provides efficient reconstruction of the object relationships when data is recovered from persistent data file 322.

Accordingly, the present invention provides, among other aspects, a method for persisting data objects without incurring the overhead of an object oriented database management system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for persisting object oriented data, comprising:

establishing persistent storage for a working data set and a committed data set;

updating current data objects in computer memory;

writing the current data objects to the working data set; and switching references to the working data set and the committed data set, whereby the working data set becomes the committed data set and the committed data set becomes the working data set.

2. The method of claim 1, further comprising writing to persistent storage a control record that references the working data set and the committed data set.

3. The method of claim 1, further comprising restoring data using data from the committed data set.

4. The method of claim 1, further comprising:

establishing persistent storage for a redundant working data set and a redundant committed data set;

writing the current data objects to the redundant working data set;

switching references to the redundant working data set and the redundant committed data set, whereby the redundant working data set becomes the redundant committed data set and the redundant committed data set becomes the redundant working data set.

5. The method of claim 4, further comprising:

writing to persistent storage a first control record that references the working data set and the committed data set; and writing to persistent storage a second control record that references the redundant working data set and the redundant committed data set.

6. The method of claim 5, further comprising writing respective timestamps to the first and second control records.

7. The method of claim 6, further comprising:

comparing the timestamps of the first control record and the second control record;

restoring data from the committed data set to the current data objects if the first control record has an earlier timestamp than the second control records; and restoring data from the redundant committed data set to the current data objects if the second control record has an earlier timestamp than the first control record.

8. The method of claim 7, further comprising:

instantiating a persistent controller object; and registering data objects for persistent storage with the persistent controller object.

9. The method of claim 8, further comprising creating a persistent object map having entries respectively associated with the data objects registered with the persistent controller object, the object map having memory address pointers associated with the registered data objects.

10. The method of claim 9, wherein each registered data object includes an associated index referencing an entry in the persistent object map.

11. The method of claim 10, wherein each entry in the persistent object map further includes a reference to a persistent storage address at which the persistent data object is stored.

12. The method of claim 11, further comprising:

writing the associated index of each persistent data object to persistent storage; and associating in persistent storage with the indices of the persistent data objects, indices of one or more persistent data objects that are related by class.

13. The method of claim 1, further comprising:

instantiating a persistent controller object; and registering data objects for persistent storage with the persistent controller object.

14. The method of claim 13, further comprising creating a persistent object map having entries respectively associated with the data objects registered with the persistent controller object, the object map having memory address pointers associated with the registered data objects.

15. The method of claim 14, wherein each registered data object includes an associated index referencing an entry in the persistent object map.

16. The method of claim 15, wherein each entry in the persistent object map further includes a reference to a persistent storage address at which the persistent data object is stored.

17. The method of claim 16, further comprising:

writing the associated index of each persistent data object to persistent storage; and associating in persistent storage with the indices of the persistent data objects, indices of one or more persistent data objects that are related by class.

18. An apparatus for persisting object oriented data, comprising:

means for establishing persistent storage for a working data set and a committed data set;

means for updating current data objects in computer memory;

means for writing the current data objects to the working data set; and means for switching references to the working data set and the committed data set, whereby the working data set becomes the committed data set and the committed data set becomes the working data set.

19. The apparatus of claim 18, further comprising means for restoring data using data from the committed data set.

20. The apparatus of claim 19, further comprising:

means for establishing persistent storage for a redundant working data set and a redundant committed data set;

means for writing the current data objects to the redundant working data set; and means for switching references to the redundant working data set and the redundant committed data set, whereby the redundant working data set becomes the redundant committed data set and the redundant committed data set becomes the redundant working data set.

* * * * *